(12) United States Patent
Zhao et al.

(10) Patent No.: US 11,745,135 B2
(45) Date of Patent: Sep. 5, 2023

(54) HETEROGENEOUS AGGLOMERATION ADSORBENT FOR HEAVY METAL ADSORPTION, METHOD FOR PREPARING SAME, AND APPLICATIONS THEREOF

(71) Applicant: HUAZHONG UNIVERSITY OF SCIENCE AND TECHNOLOGY, Hubei (CN)

(72) Inventors: Yongchun Zhao, Hubei (CN); Xiangzheng Cui, Hubei (CN); Junying Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 665 days.

(21) Appl. No.: 16/967,136

(22) PCT Filed: Oct. 12, 2019

(86) PCT No.: PCT/CN2019/110747
§ 371 (c)(1),
(2) Date: Aug. 4, 2020

(87) PCT Pub. No.: WO2020/258588
PCT Pub. Date: Dec. 30, 2020

(65) Prior Publication Data
US 2021/0370225 A1    Dec. 2, 2021

(30) Foreign Application Priority Data
Jun. 28, 2019    (CN) .......................... 201910579543.6

(51) Int. Cl.
B01D 53/22    (2006.01)
B01D 53/10    (2006.01)
(Continued)

(52) U.S. Cl.
CPC ............ *B01D 53/10* (2013.01); *B01J 20/261* (2013.01); *B01J 20/28014* (2013.01);
(Continued)

(58) Field of Classification Search
CPC .............. B01J 20/3028; B01J 20/28014; B01J 20/261; B01J 20/3085; B01D 2258/0283;
(Continued)

(56) References Cited

U.S. PATENT DOCUMENTS

| 5,180,804 | A | * | 1/1993 | Niessner | ................ | C08F 6/008 |
| | | | | | | 526/318.43 |
| 6,608,014 | B1 | * | 8/2003 | Schramm, Jr. | ....... | C11D 3/2086 |
| | | | | | | 510/330 |

(Continued)

FOREIGN PATENT DOCUMENTS

CN           105329977          2/2016

OTHER PUBLICATIONS

"International Search Report (Form PCT/ISA/210) of PCT/CN2019/110747," dated Mar. 26, 2020, pp. 1-5.

*Primary Examiner* — Anthony R Shumate
(74) *Attorney, Agent, or Firm* — JCIP GLOBAL INC.

(57) ABSTRACT

The disclosure relates to the field of heavy metal adsorbents, and a heterogeneous agglomeration adsorbent for heavy metal adsorption, a method for preparing the same, and applications are provided. The heterogeneous agglomeration adsorbent includes the following components according to percentage by weight: 0.005% to 0.01% of polyacrylamide, 0.0005% to 0.001% of calcium chloride, 0.001% to 0.01% of coconut oil fatty acid diethanolamide, and a balance is water.

18 Claims, 2 Drawing Sheets

(51) Int. Cl.
  *B01J 20/26*   (2006.01)
  *B01J 20/28*   (2006.01)
  *B01J 20/30*   (2006.01)

(52) U.S. Cl.
  CPC ....... *B01J 20/3028* (2013.01); *B01J 20/3085* (2013.01); *B01D 2253/202* (2013.01); *B01D 2257/60* (2013.01); *B01D 2258/0283* (2013.01)

(58) Field of Classification Search
  CPC .............. B01D 53/10; B01D 2253/202; B01D 2257/60
  See application file for complete search history.

(56) References Cited

U.S. PATENT DOCUMENTS

| | | | | |
|---|---|---|---|---|
| 7,713,421 | B2 * | 5/2010 | Galbraith | B01D 53/02 210/663 |
| 8,967,383 | B1 * | 3/2015 | Ma | C04B 33/04 423/118.1 |
| 2002/0000413 | A1 * | 1/2002 | Matsumoto | B01D 53/64 210/725 |
| 2008/0041544 | A1 * | 2/2008 | Tsavalas | D21H 21/54 162/157.6 |
| 2009/0018668 | A1 * | 1/2009 | Galbraith | B01D 53/02 210/175 |
| 2015/0060145 | A1 * | 3/2015 | Breese | C09K 8/04 175/65 |
| 2017/0313930 | A1 * | 11/2017 | Patel | C09K 8/882 |
| 2019/0143260 | A1 * | 5/2019 | Novek | B01D 53/1487 95/206 |
| 2019/0351390 | A1 * | 11/2019 | Wood | B01J 20/321 |
| 2021/0387163 | A1 * | 12/2021 | Wada | B01J 20/3085 |
| 2023/0149895 | A1 * | 5/2023 | Caleiro | C08L 51/08 252/194 |

\* cited by examiner

HETEROGENEOUS AGGLOMERATION ADSORBENT FOR HEAVY METAL ADSORPTION, METHOD FOR PREPARING SAME, AND APPLICATIONS THEREOF

CROSS-REFERENCE TO RELATED APPLICATION

This application is a 371 of international application of PCT application serial no. PCT/CN2019/110747, filed on Oct. 12, 2019, which claims the priority benefit of China application no. 201910579543.6, filed on Jun. 28, 2019. The entirety of each of the above mentioned patent applications is hereby incorporated by reference herein and made a part of this specification.

BACKGROUND

Technical Field

The disclosure relates to the field of heavy metal adsorbents, and more particularly, relates to a heterogeneous agglomeration adsorbent for heavy metal adsorption, a method for preparing the same, and applications thereof.

Description of Related Art

China is currently the world's largest coal producer and consumer. However, China's power coals are diverse and rich in various heavy metals, and the average contents of arsenic, selenium, and lead are 3.8 μg/g, 2.8 μg/g, and 16.9 μg/g, respectively. Further, high-heavy metal coal (more than twice the average) covers 9 major coal production areas, accounting for 66% of the country's total coal production. It thus can be seen that coal combustion is the main source of atmospheric fine particulate and heavy metals pollution.

Fine particles in the atmosphere generally are enriched with large amounts of toxic trace heavy metals, may be easily inhaled by the human body, and thus may seriously endanger human health. Due to the morphological differences among different heavy metals, different heavy metals have different characteristics in different chemical reaction intervals during combustion. As, Pb, and the like tend to stay in the bottom ashes or tend to form into sub-micron fine particles fly ashes. Some of the gaseous As and Pb are heterogeneous condensed on particle surfaces to form heavy metal aerosols or to be adsorbed by fine particles. The particle size of this type of heavy metal aerosols is significantly different from that of conventional dust particles, so they may easily penetrate through any existing dust collector device and escape out. The highly volatile Se compounds even exist in the gaseous form and are discharged directly into the chimney and enter the atmosphere. Based on the above, it can be seen that the country's coal-fired power plants face huge challenges when dealing with emission control and coordinated removal of heavy metals.

China's coal-fired power plants reach the world level of ultra-low emission control in terms of $SO_2$, NOx, dusts, and other pollutants. Nevertheless, differences in distribution and enrichment of heavy metals represented by arsenic, selenium, lead, and so on in domestic power coals are significant. Technology research and development for typical coal types and high heavy metal coal types are thus urgently needed. Through development of key technologies focusing on inhibiting of formation of gaseous heavy metal products, enhancing collaborative capturing of heavy metals by existing devices, targeted controlling of fine particulate heavy metals that may easily escape, and so on, near-zero emissions of pollutants from coal-fired power plants may be achieved.

SUMMARY

According to the above technical defects and/or improvement requirements of the related art, the disclosure provides a heterogeneous agglomeration adsorbent for heavy metal adsorption, a method for preparing the same, and applications thereof, through which components and percentages are optimized, so that an adsorption effect of the adsorbent is improved, and adsorption of gaseous heavy metals and agglomeration of fine particulate heavy metals in flue gas are facilitated.

To realize the above purpose, according to one aspect of the disclosure, a heterogeneous agglomeration adsorbent for heavy metal adsorption is provided, and the heterogeneous agglomeration adsorbent includes the following components according to percentage by weight: 0.005% to 0.01% of polyacrylamide, 0.0005% to 0.001% of calcium chloride, 0.001% to 0.01% of coconut oil fatty acid diethanolamide, and a balance is water.

Preferably, when a concentration of fine particulate heavy metals in flue gas is higher than 40 $mg/m^3$, the percentage by weight of the polyacrylamide contained in the heterogeneous agglomeration adsorbent is preferably 0.008% to 0.01%. When the concentration of the fine particulate heavy metals in the flue gas is lower than 40 $mg/m^3$, the percentage by weight of the polyacrylamide contained in the heterogeneous agglomeration adsorbent is preferably 0.005% to 0.008%.

Preferably, when a concentration of gaseous heavy metals in the flue gas is higher than 3 μg/g, the percentage by weight of the calcium chloride contained in the heterogeneous agglomeration adsorbent is preferably 0.0007% to 0.001%. When the concentration of the gaseous heavy metals in the flue gas is lower than 3 μg/g, the percentage by weight of the calcium chloride contained in the heterogeneous agglomeration adsorbent is preferably 0.0005% to 0.0007%.

According to another aspect of the disclosure, a method for preparing the above heterogeneous agglomeration adsorbent is provided, and the method specifically includes the following. The polyacrylamide is added to water and stirring is performed thoroughly. The coconut oil fatty acid diethanolamide and the calcium chloride are added after complete dissolution. Finally, stirring is performed continuously until complete dissolution is achieved, and that the heterogeneous agglomeration adsorbent is obtained.

According to still another aspect of the disclosure, a method for applying the above heterogeneous agglomeration adsorbent to heavy metal adsorption is provided, and the method specifically includes the following. The heterogeneous agglomeration adsorbent is atomized into droplets. The droplets are then sprayed into a flue before a dust collector for capturing gaseous heavy metals and agglomerating fine particulate heavy metals, thereby adsorbing heavy metals.

Preferably, a grain diameter of the droplets is preferably 50 μm to 60 μm.

Preferably, the heterogeneous agglomeration adsorbent is preferably inputted in an amount of 1,000 kg/h to 2,000 kg/h.

In general, the above technical solutions provided by the disclosure have the following technical advantages compared to the related art.

1. The heterogeneous agglomeration adsorbent provided by the disclosure includes polyacrylamide, calcium chloride, coconut oil fatty acid diethanolamide, and water. A calcium ion may react with heavy metals such as arsenic and selenium in the gas phase and thus may facilitate heterogeneous adsorption of gaseous heavy metals, so that the gaseous heavy metals are fixed on the heterogeneous agglomeration adsorbent. Furthermore, the removal efficiency of gaseous heavy metals in the dust collector is improved. Moreover, the polyacrylamide dissolved in water has a large number of amide groups in the main chain, and chemical activity of the amide groups is high, the polyacrylamide may thus be electrically neutralized among fine particles enriched in heavy metal. A long polymer chain adsorbed on the surface of a particle may be adsorbed on the surface of another particle at the same time. Two or more particles are agglomerated by "bridging". Particles may be agglomerated through electrical neutralization and adsorption bridging, such that efficiency of removing fine particulate heavy metals provided by the dust collector is enhanced. In addition, the coconut oil fatty acid diethanolamide may lower surface tension of water, such that solubility of an organic compound is enhanced, which is conducive to agglomeration. Therefore, the heterogeneous agglomeration adsorbent provided by the disclosure brings a good agglomeration effect on gaseous heavy metals and fine particulate heavy metals, so that heavy metal emissions of coal-fired power plants may be reduced by more than 50%.

2. In particular, in the heterogeneous agglomeration adsorbent provided by the disclosure, the percentage of components in the heterogeneous agglomeration adsorbent may be adjusted according to the flue gas conditions and heavy metal emission characteristics, and strong adaptability is thus provided. When the concentration of the gaseous heavy metals in the flue gas is high, the concentration of the calcium chloride may be increased to facilitate reaction of calcium ions with heavy metals in the gas phase. When the concentration of the fine particulate heavy metals in the flue gas is high, the concentration of the polyacrylamide may be increased to facilitate agglomeration of the fine particulate heavy metals.

3. In addition, the method for preparing the heterogeneous agglomeration adsorbent provided by the disclosure requires raw materials which may be obtained through a wide range of sources, requires low costs, features a simple and fast synthesis process, and brings no harm to the environment. Therefore, the method may be widely applied.

4. Further, in the disclosure, the heterogeneous agglomeration adsorbent is sprayed into the flue before the dust collector after being atomized, the adsorbent may thus fully contact the gaseous heavy metals and the fine particulate heavy metals and cause adsorption and agglomeration. Therefore, the removal efficiency of gaseous heavy metals in the dust collector is improved.

DESCRIPTION OF THE EMBODIMENTS

To better illustrate the goal, technical solutions, and advantages of the disclosure, the following embodiments accompanied with drawings are provided so that the disclosure are further described in detail. It should be understood that the specific embodiments described herein serve to explain the disclosure merely and are not used to limit the disclosure. In addition, the technical features involved in the various embodiments of the disclosure described below can be combined with each other as long as the technical features do not conflict with each other.

Figure 1:
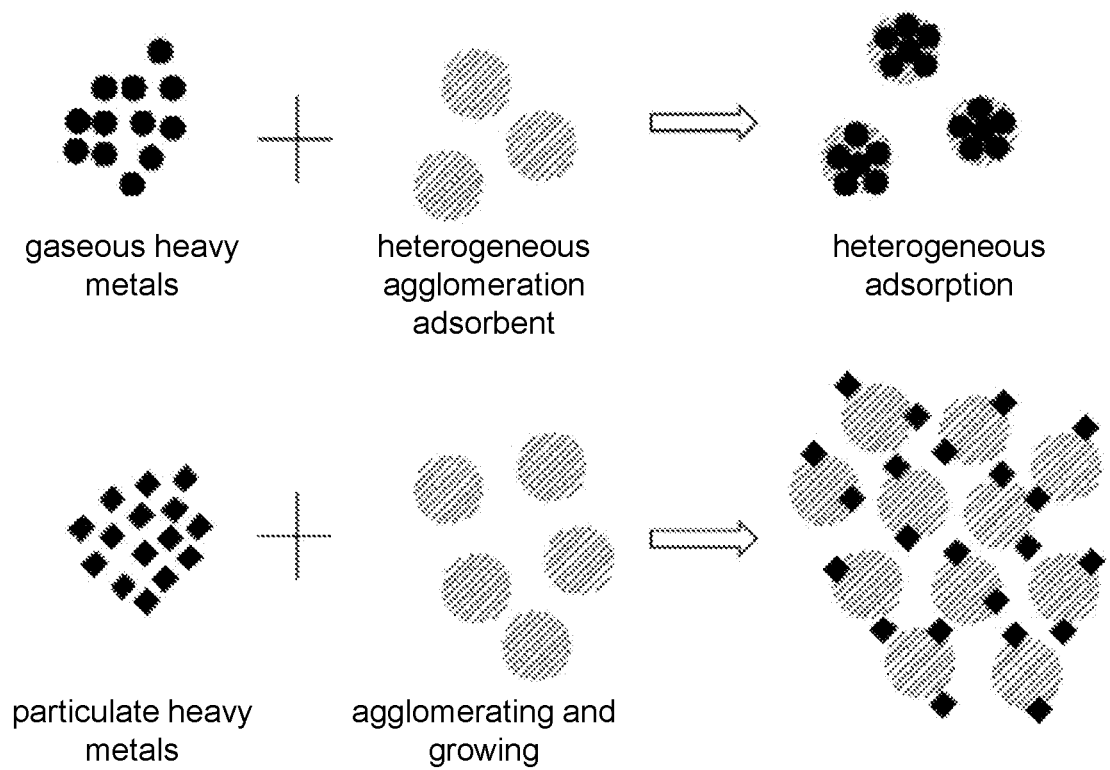
FIG. 1 is a schematic diagram of functions of a heterogeneous agglomeration adsorbent for heavy metal adsorption according the disclosure.

As shown in FIG. 1, an embodiment of the disclosure provides a heterogeneous agglomeration adsorbent for heavy metal adsorption. The heterogeneous agglomeration adsorbent includes the following components according to percentage by weight: 0.005% to 0.01% of polyacrylamide, 0.0005% to 0.001% of calcium chloride, 0.001% to 0.01% of coconut oil fatty acid diethanolamide, and a balance is water.

Further, the calcium chloride is configured to provide a calcium ion so as to react with heavy metals such as arsenic and selenium in a gas phase and thus facilitates heterogeneous agglomeration of gaseous heavy metals. When a concentration of gaseous heavy metals in flue gas is higher than 3 μg/g, the percentage by weight of the calcium chloride contained in the heterogeneous agglomeration adsorbent is preferably 0.0007% to 0.001% to facilitate heterogeneous agglomeration of the calcium ion and the gaseous heavy metals. When the concentration of the gaseous heavy metals in the flue gas is lower than 3 μg/g, the percentage by weight of the calcium chloride contained in the heterogeneous agglomeration adsorbent is preferably 0.0005% to 0.0007%.

Moreover, a main chain of the polyacrylamide has a large number of highly chemically active amide groups, and the polyacrylamide may be electrically neutralized among fine particles enriched in heavy metal. Further, facilitation of agglomeration of particles may be performed through adsorption bridging. Therefore, when the concentration of the fine particulate heavy metals in the flue gas is higher than 40 $mg/m^3$, the percentage by weight of the polyacrylamide contained in the heterogeneous agglomeration adsorbent is preferably 0.008% to 0.01%, and in this way, adsorption of fine particulate heavy metals is facilitated. When the concentration of the fine particulate heavy metals in the flue gas is lower than 40 $mg/m^3$, the percentage by weight of the polyacrylamide contained in the heterogeneous agglomeration adsorbent is preferably 0.005% to 0.008%.

The disclosure further provides a method for preparing the above heterogeneous agglomeration adsorbent. The method specifically includes the following. The polyacrylamide is added to water and a stirring is performed thoroughly. The coconut oil fatty acid diethanolamide and the calcium chloride are added after complete dissolution. Finally, the stirring is performed continuously until complete dissolution is achieved, and that the heterogeneous agglomeration adsorbent is obtained.

Figure 2:
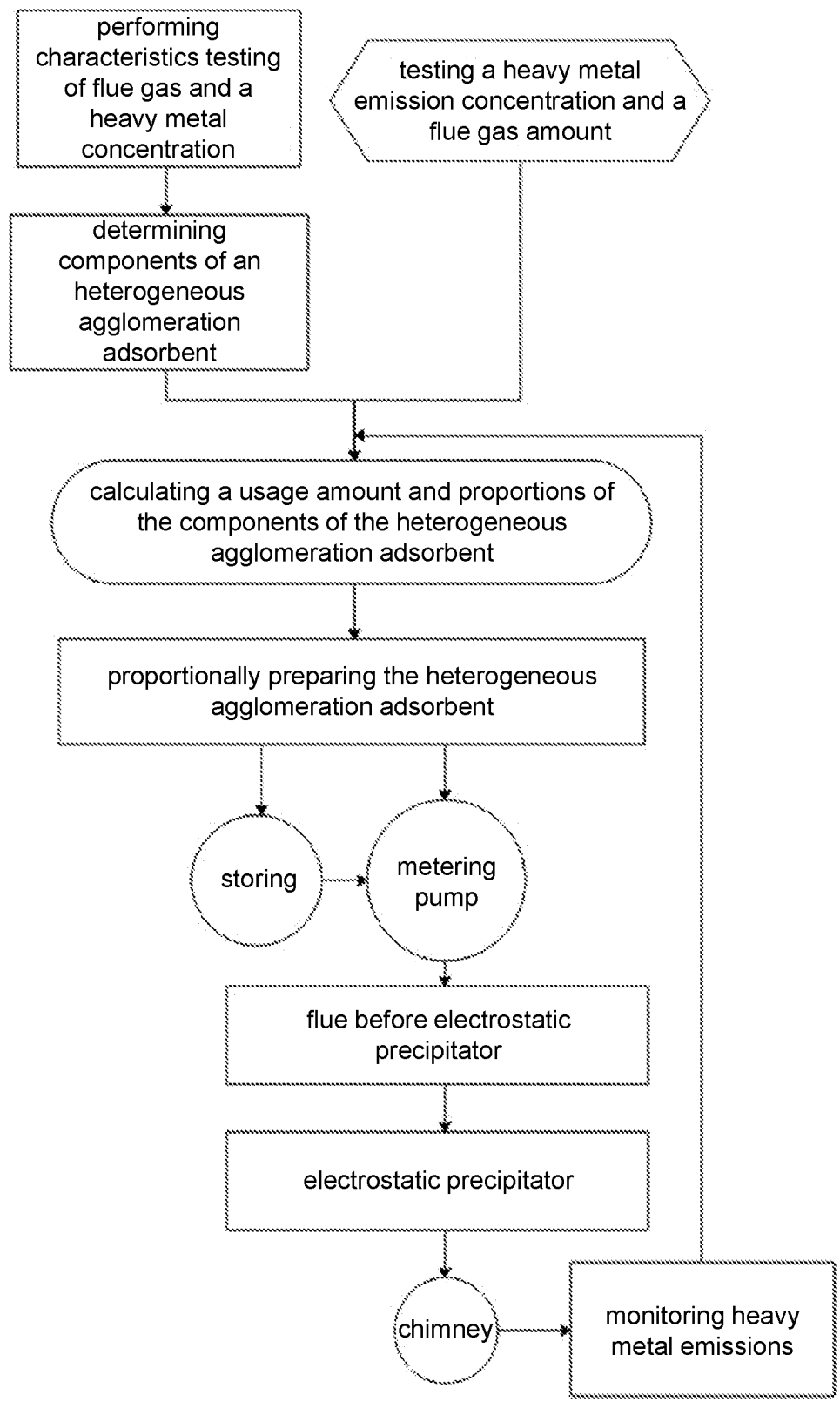
FIG. 2 is a flow chart of heavy metal adsorption by using the heterogeneous agglomeration adsorbent according to a preferred embodiment of the disclosure.

As shown in FIG. 2, the disclosure further provides a method for applying the above heterogeneous agglomeration adsorbent to heavy metal adsorption. The method specifically includes the following. The heterogeneous agglomeration adsorbent is atomized into droplets. The droplets are then sprayed into a flue before a dust collector for capturing gaseous heavy metals and agglomerating fine particulate heavy metals, thereby adsorbing heavy metals.

Before use, different components in a raw material may be stored independently, and mixed according to the ratio to obtain the heterogeneous agglomeration adsorbent. Alternatively, a high-concentration solution may be proportionally prepared for storage, and industrial water is added in proportion for dilution when the components are used to obtain the heterogeneous agglomeration adsorbent. Nevertheless, the storage time of the prepared high-concentration solution shall not be too long, preferably one week.

Further, a grain diameter of the droplets is preferably 50 μm to 60 μm. Droplets falling in this grain diameter range may interact with particulate matters in the flue and in the flue gas, so that a good adsorption effect is achieved.

The heterogeneous agglomeration adsorbent is preferably inputted in an amount of 1,000 kg/h to 2,000 kg/h, and in this way, favorable removal efficiency is provided without the need for increased production costs.

The heterogeneous agglomeration may bring technical transformation for dust removal equipment of industrial systems such as coal-fired power plants, cement plants, smelters, etc. According to different flue gas conditions and different characteristics of coal-fired heavy metal emission concentrations, the percentages of different components in the heterogeneous agglomeration adsorbent may be adjusted, so as to determine an amount of the heterogeneous agglomeration adsorbent to be used. A double-flow atomizing nozzle is arranged in the flue before the dust collector, and the heterogeneous agglomeration adsorbent is sprayed in the flue in a form of micron droplets. In this way, trapping of gaseous heavy metals is facilitated, and fine particle heavy metals are agglomerated. Efficiency of removing the gaseous heavy metals and fine particulate heavy metals performed by the dust collector is improved, so that concentration of heavy metal emissions is lowered, and atmosphere environment is thereby protected.

The disclosure is further described in detail according to the following specific embodiments.

Embodiment 1

A heterogeneous agglomeration adsorbent is prepared, and the heterogeneous agglomeration adsorbent includes the following components: 0.01% of polyacrylamide, 0.0005% of calcium chloride, 0.008% of coconut oil fatty acid diethanolamide, and the balance is water.

Using the ash of the fifth-stage electric field of an electrostatic precipitator of a power plant are mixed with preheated air containing arsenic and selenium as simulated flue gas to be introduced into a reaction chamber. The heterogeneous agglomeration adsorbent is atomized into droplets with a grain diameter of 60 μm, and the droplets are sprayed and inputted into the reaction chamber in an amount of 1,000 kg/h. The two interact in the simulated flue environment in the reaction chamber for a residence time of approximately 3 s. The heterogeneous agglomeration adsorbent facilitates the agglomeration and growth of fine particles to be captured by a subsequent bag dust collector. A conventional chemical fiber filter material is adopted for the bag. EPA29 is adopted for heavy metal sampling performed at the rear exit of the bag dust collector device, and the concentration of heavy metal emissions is then measured.

Test results show that the concentration of heavy metal emissions decreases significantly after the heterogeneous agglomeration adsorbent is sprayed. At the rear exit of the dust collector device, gaseous heavy metals and fine particulate heavy metals are reduced by 48.7% and 64.3% respectively compared to that without spraying the heterogeneous agglomeration adsorbent.

Embodiment 2

A heterogeneous agglomeration adsorbent is prepared, and the heterogeneous agglomeration adsorbent includes the following components: 0.005% of polyacrylamide, 0.001% of calcium chloride, 0.006% of coconut oil fatty acid diethanolamide, and the balance is water.

Using the ash of the fifth-stage electric field of an electrostatic precipitator of a power plant are mixed with preheated air containing arsenic and selenium as simulated flue gas to be introduced into a reaction chamber. The heterogeneous agglomeration adsorbent is atomized into droplets with a grain diameter of 55 μm, and the droplets are sprayed into the reaction chamber with an input amount of 1,100 kg/h. The two interact in the simulated flue environment in the reaction chamber for a residence time of approximately 3 s. The heterogeneous agglomeration adsorbent facilitates the agglomeration and growth of fine particles to be captured by a subsequent bag dust collector. A conventional chemical fiber filter material is adopted for the bag. EPA29 is adopted for heavy metal sampling performed at the rear exit of the bag dust collector device, and the concentration of heavy metal emissions is then measured.

Test results show that the concentration of heavy metal emissions decreases significantly after the heterogeneous agglomeration adsorbent is sprayed. At the rear exit of the dust collector device, gaseous heavy metals and fine particulate heavy metals are reduced by 52.3% and 66.7% respectively compared to that without spraying the heterogeneous agglomeration adsorbent.

Embodiment 3

A heterogeneous agglomeration adsorbent is prepared, and the heterogeneous agglomeration adsorbent includes the following components: 0.006% of polyacrylamide, 0.0007% of calcium chloride, 0.01% of coconut oil fatty acid diethanolamide, and the balance is water.

Using the ash of the fifth-stage electric field of an electrostatic precipitator of a power plant are mixed with preheated air containing arsenic and selenium as simulated flue gas to be introduced into a reaction chamber. The heterogeneous agglomeration adsorbent is atomized into droplets with a grain diameter of 58 μm, and the droplets are sprayed into the reaction chamber with an input amount of 1,300 kg/h. The two interact in the simulated flue environment in the reaction chamber for a residence time of approximately 3 s. The heterogeneous agglomeration adsorbent facilitates the agglomeration and growth of fine particles to be captured by a subsequent bag dust collector. A conventional chemical fiber filter material is adopted for the bag. EPA29 is adopted for heavy metal sampling performed at the rear exit of the bag dust collector device, and the concentration of heavy metal emissions is then measured.

Test results show that the concentration of heavy metal emissions decreases significantly after the heterogeneous agglomeration adsorbent is sprayed. At the rear exit of the dust collector device, gaseous heavy metals and fine particulate heavy metals are reduced by 55.4% and 69.8% respectively compared to that without spraying the heterogeneous agglomeration adsorbent.

Embodiment 4

A heterogeneous agglomeration adsorbent is prepared, and the heterogeneous agglomeration adsorbent includes the following components: 0.008% of polyacrylamide, 0.0009% of calcium chloride, 0.001% of coconut oil fatty acid diethanolamide, and the balance is water.

Before a 300 MW boiler electrostatic precipitator, the heterogeneous agglomeration adsorbent is atomized into droplets with a grain diameter of 50 μm through a liquid distribution pump, compressed air, and a double-flow atomizing nozzle. The heterogeneous agglomeration adsorbent is sprayed to be inputted in an amount of 2,000 kg/h into a vertical flue for heavy metal adsorption.

In the flue gas, the gaseous heavy metals and the fine particulate heavy metals are reduced by 59.6% and 75.2% respectively compared to that without spraying the heterogeneous agglomeration adsorbent.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heterogeneous agglomeration adsorbent for heavy metal adsorption, wherein comprising the following components according to percentage by weight: 0.005% to 0.01% of polyacrylamide, 0.0005% to 0.001% of calcium chloride, 0.001% to 0.01% of coconut oil fatty acid diethanolamide, and a balance is water.

2. The heterogeneous agglomeration adsorbent for heavy metal adsorption according to claim 1, wherein the percentage by weight of the polyacrylamide contained in the heterogeneous agglomeration adsorbent is 0.008% to 0.01% when a concentration of fine particulate heavy metals in flue gas is higher than 40 mg/m$^3$, and the percentage by weight of the polyacrylamide contained in the heterogeneous agglomeration adsorbent is 0.005% to 0.008% when the concentration of the fine particulate heavy metals in the flue gas is lower than 40 mg/m$^3$.

3. The heterogeneous agglomeration adsorbent for heavy metal adsorption according to claim 1, wherein the percentage by weight of the calcium chloride contained in the heterogeneous agglomeration adsorbent is 0.0007% to 0.001% when a concentration of gaseous heavy metals in the flue gas is higher than 3 μg/g, and the percentage by weight of the calcium chloride contained in the heterogeneous agglomeration adsorbent is 0.0005% to 0.0007% when the concentration of the gaseous heavy metals in the flue gas is lower than 3 μg/g.

4. A method for preparing the heterogeneous agglomeration adsorbent according to claim 1, wherein the method specifically comprises: adding the polyacrylamide to water and performing stirring thoroughly; adding the coconut oil fatty acid diethanolamide and the calcium chloride after complete dissolution; and stirring continuously until complete dissolution to obtain the heterogeneous agglomeration adsorbent.

5. A method for applying the heterogeneous agglomeration adsorbent according to claim 1 to heavy metal adsorption, wherein the method specifically comprises: atomizing the heterogeneous agglomeration adsorbent into droplets; spraying the droplets into a flue before a dust collector for capturing the gaseous heavy metals and agglomerating the fine particulate heavy metals, thereby adsorbing heavy metals.

6. The method for applying the heterogeneous agglomeration adsorbent to heavy metal adsorption according to claim 5, wherein a grain diameter of the droplets is 50 μm to 60 μm.

7. The method for applying the heterogeneous agglomeration adsorbent to heavy metal adsorption according to claim 5, wherein the heterogeneous agglomeration adsorbent is inputted in an amount of 1,000 kg/h to 2,000 kg/h.

8. The heterogeneous agglomeration adsorbent for heavy metal adsorption according to claim 2, wherein the percentage by weight of the calcium chloride contained in the heterogeneous agglomeration adsorbent is 0.0007% to 0.001% when a concentration of gaseous heavy metals in the flue gas is higher than 3 μg/g, and the percentage by weight of the calcium chloride contained in the heterogeneous agglomeration adsorbent is 0.0005% to 0.0007% when the concentration of the gaseous heavy metals in the flue gas is lower than 3 μg/g.

9. A method for preparing the heterogeneous agglomeration adsorbent according to claim 2, wherein the method specifically comprises: adding the polyacrylamide to water and performing stirring thoroughly; adding the coconut oil fatty acid diethanolamide and the calcium chloride after complete dissolution; and stirring continuously until complete dissolution to obtain the heterogeneous agglomeration adsorbent.

10. A method for preparing the heterogeneous agglomeration adsorbent according to claim 3, wherein the method specifically comprises: adding the polyacrylamide to water and performing stirring thoroughly; adding the coconut oil fatty acid diethanolamide and the calcium chloride after complete dissolution; and stirring continuously until complete dissolution to obtain the heterogeneous agglomeration adsorbent.

11. A method for preparing the heterogeneous agglomeration adsorbent according to claim 8, wherein the method specifically comprises: adding the polyacrylamide to water and performing stirring thoroughly; adding the coconut oil fatty acid diethanolamide and the calcium chloride after complete dissolution; and stirring continuously until complete dissolution to obtain the heterogeneous agglomeration adsorbent.

12. A method for applying the heterogeneous agglomeration adsorbent according to claim 2 to heavy metal adsorption, wherein the method specifically comprises: atomizing the heterogeneous agglomeration adsorbent into droplets; spraying the droplets into a flue before a dust collector for capturing the gaseous heavy metals and agglomerating the fine particulate heavy metals, thereby adsorbing heavy metals.

13. The method for applying the heterogeneous agglomeration adsorbent to heavy metal adsorption according to claim 12, wherein a grain diameter of the droplets is 50 μm to 60 μm.

14. A method for applying the heterogeneous agglomeration adsorbent according to claim 3 to heavy metal adsorption, wherein the method specifically comprises: atomizing the heterogeneous agglomeration adsorbent into droplets; spraying the droplets into a flue before a dust collector for capturing the gaseous heavy metals and agglomerating the fine particulate heavy metals, thereby adsorbing heavy metals.

15. The method for applying the heterogeneous agglomeration adsorbent to heavy metal adsorption according to claim 14, wherein a grain diameter of the droplets is 50 μm to 60 μm.

16. A method for applying the heterogeneous agglomeration adsorbent according to claim 8 to heavy metal adsorption, wherein the method specifically comprises: atomizing the-heterogeneous agglomeration adsorbent into droplets; spraying the droplets into a flue before a dust collector for capturing the gaseous heavy metals and agglomerating the fine particulate heavy metals, thereby adsorbing heavy metals.

17. The method for applying the heterogeneous agglomeration adsorbent to heavy metal adsorption according to claim 16, wherein a grain diameter of the droplets is 50 μm to 60 μm.

18. The method for applying the heterogeneous agglomeration adsorbent to heavy metal adsorption according to claim 6, wherein the heterogeneous agglomeration adsorbent is inputted in an amount of 1,000 kg/h to 2,000 kg/h.

\* \* \* \* \*